United States Patent
Sata et al.

(10) Patent No.: US 7,271,734 B2
(45) Date of Patent: Sep. 18, 2007

(54) REMOTE CONTROL TRANSMITTER

(75) Inventors: Norifumi Sata, Hyogo (JP); Yoshiki Taketa, Osaka (JP); Hiroshi Imada, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 597 days.

(21) Appl. No.: 10/784,342

(22) Filed: Feb. 23, 2004

(65) Prior Publication Data

US 2004/0207766 A1    Oct. 21, 2004

(30) Foreign Application Priority Data

Mar. 18, 2003    (JP)    ............................. 2003-073847

(51) Int. Cl.
G08C 19/00    (2006.01)
(52) U.S. Cl. ................. 340/825.72; 341/176; 348/734; 345/169; 715/716
(58) Field of Classification Search ........... 340/825.69, 340/825.72, 825.22, 825.24, 825.25; 341/175, 341/176; 348/734; 398/106, 112; 345/156, 345/158, 169; 715/864, 716, 744; 725/38
See application file for complete search history.

(56) References Cited

U.S. PATENT DOCUMENTS 5,552,806 A * 9/1996 Lenchik ....................... 345/156
5,898,435 A * 4/1999 Nagahara et al. ............ 715/841
5,956,025 A * 9/1999 Goulden et al. ............. 715/716
6,266,098 B1 * 7/2001 Cove et al. .................. 348/563
6,788,241 B2 * 9/2004 Arling et al. ................ 341/176
2003/0095156 A1 * 5/2003 Klein et al. .................. 345/864
2003/0103088 A1 * 6/2003 Dresti et al. ................. 345/835
2004/0067778 A1 * 4/2004 Sata et al. .................... 455/566

FOREIGN PATENT DOCUMENTS

JP    2002-152863 A    5/2002

* cited by examiner

Primary Examiner—Edwin C. Holloway, III
(74) Attorney, Agent, or Firm—RatnerPrestia

(57) ABSTRACT

A remote control transmitter is so constructed that when a group menu representing a combination of individual functions is selected by operation of an operating part, a controller effects display of the individual functions of the group menu in parallel with the group menu. Since the correspondence between an overview of the plurality of group menus and the individual functions of the specified group menu is easy to understand, the remote control transmitter obtained allows easy setting of the function.

6 Claims, 6 Drawing Sheets

REMOTE CONTROL TRANSMITTER

BACKGROUND OF THE INVENTION

1. Field of the Invention

The present invention relates to a remote control transmitter for remotely controlling an apparatus.

2. Background Art

With increasing numbers of devices capable of remotely controlling an apparatus such as a television or a videocassette recorder, remote control transmitters each capable of remotely controlling a plurality of such apparatuses through operation have recently increased in number.

Also, devices capable of storing a plurality of frequently used individual functions and sending a specified function of these set functions or all the set individual functions have increased in number.

With reference to FIGS. 6-8A, 8B and 8C, one of such conventional remote control transmitters is described hereinafter.

FIG. 6 is an external view of the conventional remote control transmitter. FIG. 7 is a circuit diagram of the same remote control transmitter. In FIG. 6, the remote control transmitter is provided with display part 1, such as a liquid crystal display element, at its left front.

At the right front of the remote control transmitter, up and down selection buttons 2D, 2E, left and right selection buttons 2F, 2G, "ENTER" button 2C, "POWER" button 2A and others are arranged, thus forming operating part 2.

The remote control transmitter is stored with controller 3. Transmitter 4 is disposed above display part 1, converts an electric signal from controller 3 into an infrared signal and transmits the infrared signal. Transmitter 4, operating part 2 and display part 1 are connected to controller 3. In this way, the remote control transmitter is formed.

A description is provided next of a remote control using the thus-constructed remote control transmitter for turning on, for example, the power to the television.

First, "POWER" button 2A is pressed. Upon detecting this press, controller 3 causes display part 1 to display an initial screen, such as illustrated by FIG. 8A. This initial screen shows an apparatus menu such as "TV", which denotes the television to be remotely controlled, and others.

Here, translucent cursor 1A used for selecting a displayed option appears on "TV" located at the top of the screen. Subsequently, "ENTER" button 2C is pressed with cursor 1A located at "TV". Upon detecting this press, controller 3 effects display of a screen, such as illustrated by FIG. 8B, showing the individual functions including "ON", which represents the turning-on of the power to the television.

On this screen, cursor 1A appears on "ON" located at the upper left. When "ENTER" button 2C is pressed with cursor 1A located at "ON", controller 3 outputs the electric signal corresponding to "ON" for remote control. Transmitter 4 converts this electric signal into the infrared signal and transmits this infrared signal. Consequently, the power to the television is turned on by remote control.

A description is provided next of setting or storage of the plurality of individual functions including turning on the power to the television, turning on the power to the videocassette recorder and playing back a videocassette, and transmission of a specified function of these set functions.

First, "HOME" button 2B shown in FIG. 6 is pressed to display, as shown in FIG. 8A, the initial screen displaying group menus including "Favorite" representing a combination of the frequently used specified functions, in addition to the apparatus menus.

Next, cursor 1A in FIG. 8A is moved to "Favorite", and "SETTING" button 2H is pressed. Upon detecting this press, controller 3 brings about a state in which the individual functions can be added to "Favorite".

Subsequently, the same procedure used in turning on the power to the television by remote control is followed. Specifically, cursor 1A is moved to "TV", and then "ENTER" button 2C is pressed. Thereafter, cursor 1A is moved to "ON", and "ENTER" button 2C is pressed. In this way, the function for turning on the power to the television can be added to "Favorite".

Next, "HOME" button 2B is pressed, whereby the initial screen is restored. When "ENTER" button 2C is pressed with cursor 1A moved to "VCR" denoting the videocassette recorder, a screen such as illustrated by FIG. 8C appears, displaying the individual functions including "ON", which represents the turning-on of the power to the videocassette recorder.

When "ENTER" button 2C is pressed with cursor 1A located at "ON" on this screen, the function for turning on the power to the videocassette recorder is added to "Favorite".

Thereafter, "SETTING" button 2H is pressed. By detecting this press, controller 3 judges that the setting has been terminated, and restores the view of display part 1 to the initial screen.

As described above, in addition of the individual function to "Favorite", "HOME" button 2B must be pressed to restore the initial screen displaying the group menus and others.

When "Favorite" is selected on the initial screen, a screen showing the functions such as turning on the power to the television and turning on the power to the videocassette recorder is displayed. By pressing "ENTER" button 2C with cursor 1A moved to the function for turning on the power to the television on that screen, such remote control as to turn on the power to the television can be carried out.

A description is provided next of setting or storage of the plurality of individual functions including turning on the power to the television, turning on the power to the videocassette recorder and playing back the videocassette, and transmission of all these set functions.

First, "HOME" button 2B is pressed to display, as shown in FIG. 8A, the initial screen displaying the group menus including "Macro" representing a combination of the individual functions, in addition to the apparatus menus.

Next, cursor 1A is moved to "Macro", and "SETTING" button 2H is pressed. In the same manner as in the addition of the specified functions to "Favorite", the function for turning on the power to the television, the function for turning on the power to the videocassette recorder and the function for playing back the videocassette are added to "Macro" in this order.

Thereafter, "SETTING" button 2H is pressed. By detecting this press, controller 3 judges that the setting has been terminated and restores the view of display part 1 to the initial screen.

As described above, even in addition of the individual functions to "Macro", "HOME" button 2B must be pressed to restore the initial screen displaying the group menus and others.

When "ENTER" button 2C is pressed with cursor 1A moved to "Macro" on the initial screen, controller 3 detects this press and successively outputs the electric signal corresponding to the turning-on of the power to the television, the electric signal corresponding to the turning-on of the power to the videocassette recorder and the electric signal corresponding to the replay of the videocassette in this order for remote control.

Accordingly, transmitter 4 converts these electric signals into the infrared signals and transmits those infrared signals, whereby first, the power to the television is turned on, next, the power to the videocassette recorder is turned on, and then the videocassette is replayed.

Japanese Patent Unexamined Publication No. 2002-152863 is known as an example of conventional art that pertains to the above-described invention.

The above-described conventional remote control transmitter, however, requires that in setting of the specified function such as the frequently used individual function, "HOME" button 2B should be pressed to restore the initial screen displaying the group menus each representing the combination of the set individual functions, and others. The correspondence between an overview of the plurality of group menus and the individual functions of the specified group menu is thus hard to understand, and accordingly, the specified function is hard to set.

SUMMARY OF THE INVENTION

A remote control transmitter includes:

a display part for displaying at least one of an individual function of an apparatus to be remotely controlled and a group menu representing a combination of the individual functions;

an operating part for selecting and deciding on the at least one of the individual function and the group menu;

a transmitter for sending a signal for remotely controlling the apparatus; and a controller for controlling a view of the display part in response to an operation of the operating part, wherein the controller causes the display part to display the group menu and the individual functions of the group menu simultaneously when the group menu is selected by the operation of the operating part.

DETAILED DESCRIPTION OF THE INVENTION

Exemplary embodiments of the present invention are demonstrated hereinafter with reference to FIGS. 1-5.

FIRST EMBODIMENT

Figure 1:
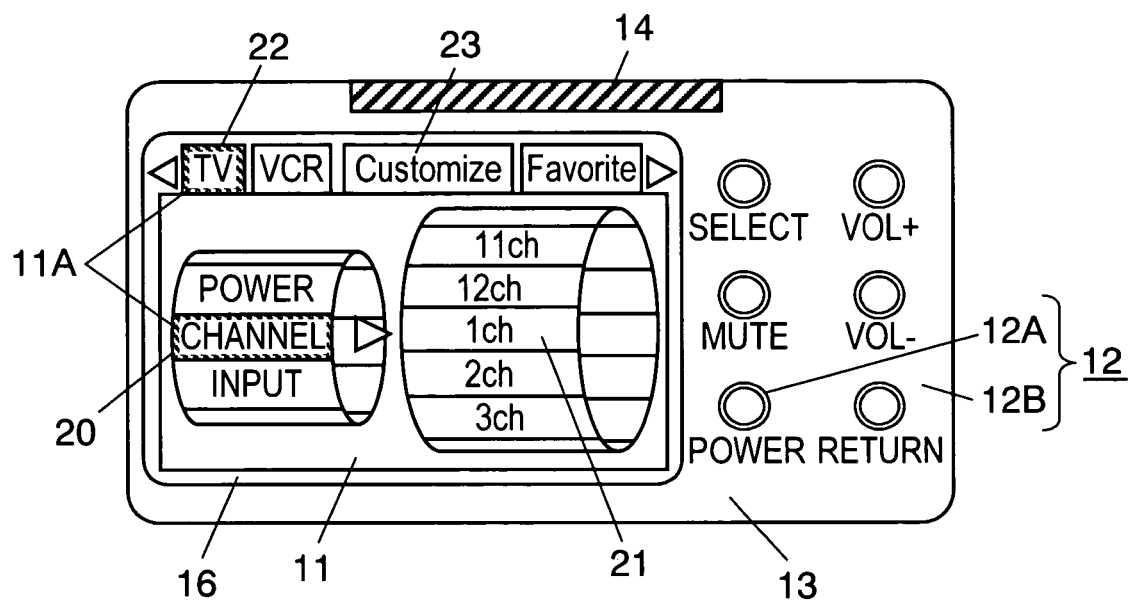
FIG. 1 is an external view of a remote control transmitter in accordance with a first exemplary embodiment of the present invention.
Figure 2:
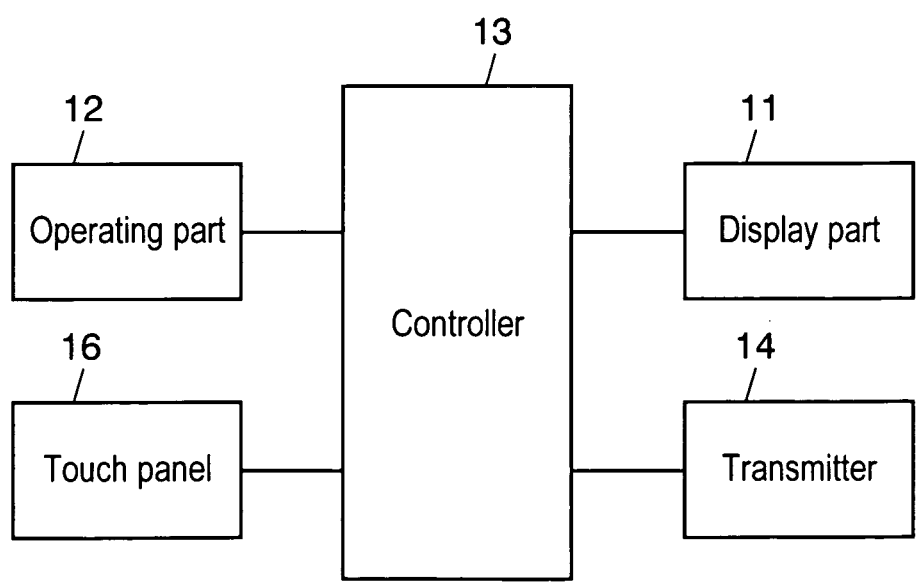
FIG. 2 is a circuit diagram of the remote control transmitter in FIG. 1.

FIG. 1 is an external view of a remote control transmitter in accordance with the first exemplary embodiment of the present invention, and FIG. 2 is a circuit diagram of the same remote control transmitter. In FIG. 1, the remote control transmitter is provided with display part 11, such as a liquid crystal display element, at its left front.

On a left portion of display part 11, a plurality of group menus 20 is provided vertically on an outer periphery of a cylindrical frame and includes "CHANNEL" and "INPUT", each representing a combination of individual functions of an apparatus to be remotely controlled.

Here, translucent cursor 11A used for selecting a displayed option is displayed at middle group menu 20, "CHANNEL".

On the right of these group menus 20, a plurality of individual functions 21 is provided vertically on an outer periphery of another cylindrical frame and includes "Channel 1" and "Channel 2", representing the respective individual functions in group menu 20, "CHANNEL", which is being selected by cursor 11A.

Above these group menus 20 and individual functions 21, apparatus menus 22 including "TV", which denotes the television to be remotely controlled, and representative menus 23 including "Customize", which represents a combination of group menus 20, are arranged side by side.

At the right front of the remote control transmitter, "POWER" button 12A, "RETURN" button 12B and others are disposed, thus forming operating part 12.

Display part 11 is provided with so-called transparent touch panel 16 at its front. This panel 16 is formed of a flexible upper substrate having transparent upper electrodes made of indium-tin oxide or the like on its bottom surface, and a lower substrate having, on its top surface, lower electrodes facing the respective upper electrodes across a specified clearance.

The remote control transmitter is stored with controller 13 formed of, for example, a microcomputer. Transmitter 14 formed of, for example, an infrared-emitting diode is disposed above display part 11, converts an electric signal from controller 13 into an infrared signal and transmits the infrared signal.

Transmitter 14, display part 11, operating part 12 and transparent touch panel 16 are connected to controller 13. In this way, the remote control transmitter is formed.

A description is provided hereinafter of setting or storage of the plurality of frequently used individual functions and transmission of a specified function of these set functions through use of the thus-constructed remote control transmitter.

First, "POWER" button 12A is pressed. Upon detecting this press, controller 13 causes display part 11 to display an initial screen, such as shown in FIG. 1. The initial screen shows individual functions 21, group menus 20, apparatus menus 22, representative menus 23 and others simultaneously.

Here, cursors 11A appear on upper-left apparatus menu 22, "TV", and middle group menu 20, "CHANNEL", respectively.

Figure 3A:
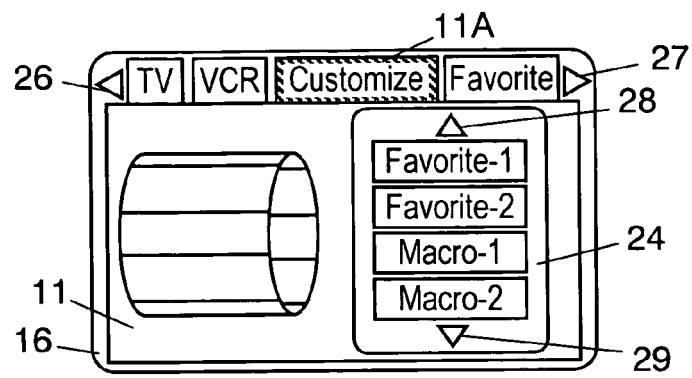
FIGS. 3A, 3B, 3C and 3D illustrate respective views of the remote control transmitter of FIG. 1.

Next, a part of transparent touch panel 16 that is in front of "Customize", which is representative menu 23, is touched, whereby the upper and lower electrodes of panel 16 that correspond to this part are brought to an ON state. Upon detecting this ON state, controller 13 moves cursor 11A to "Customize" as shown in FIG. 3A.

Controller 13 also effects display of the cylindrical frame on a lower-left portion and group menu name selection screen 24 displaying vertically arranged names of group menus 20 on the right of the cylindrical frame. The names of group menus 20 include "Favorite-1", which will be displayed on the cylindrical frame.

Figure 3B:
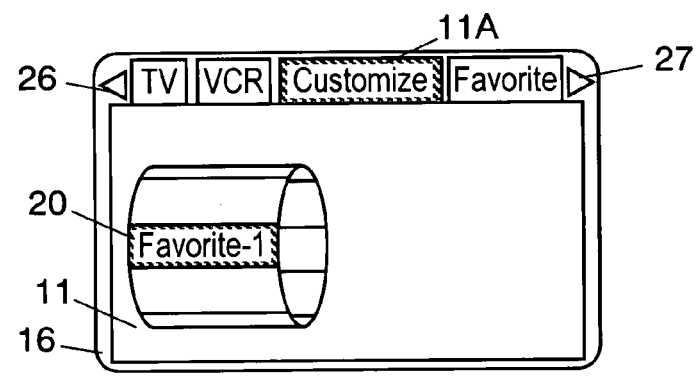

When a part of transparent touch panel 16 that is in front of "Favorite-1" is touched on the above screen, controller 13 effects, as shown in FIG. 3B, display of "Favorite-1" as group menu 20 on the outer periphery of the left cylindrical frame.

Figure 3C:
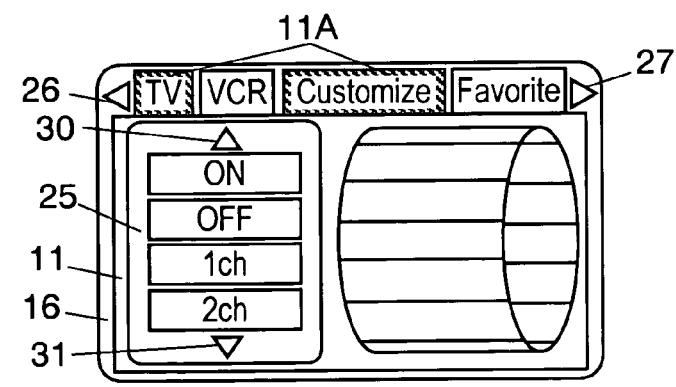

Thereafter, a part of transparent touch panel 16 that is in front of "TV", which is apparatus menu 22 denoting the television, is touched. Accordingly, cursor 11A appears on "TV" as shown in FIG. 3C, thus selecting the television.

Here, function name selection screen 25 appears in place of the cylindrical frame displaying group menu 20, and another cylindrical frame appears on the right of this screen 25. Function name selection screen 25 displays vertically arranged names of the individual functions of the television, such as "ON".

Figure 3D:
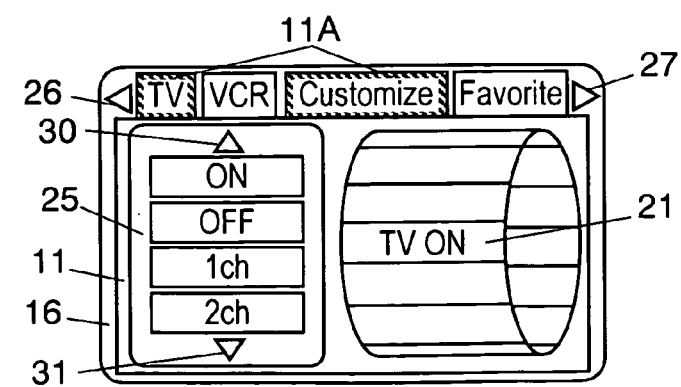

Subsequently, a part of transparent touch panel 16 that is in front of "ON" is touched on function name selection screen 25. Accordingly, "TV ON", which is individual function 21 for turning on the power to the television, appears on the outer periphery of the right cylindrical frame as shown in FIG. 3D.

In other words, "TV ON", which is individual function 21, is added to "Favorite-1", which is group menu 20, by controller 13.

Figure 4A:
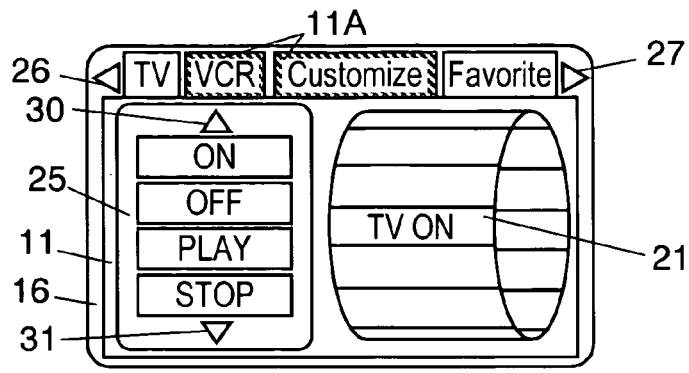
FIGS. 4A, 4B, 4C and 4D illustrate respective views of the remote control transmitter of FIG. 1.

Next, a part of transparent touch panel 16 that is in front of "VCR", which is apparatus menu 22 denoting the videocassette recorder, is touched. Accordingly, cursor 11A moves from "TV" to "VCR" as shown in FIG. 4A.

Here, the names of the individual functions of the television that have been displayed on function name selection screen 25 are replaced by names of the individual functions of the videocassette recorder.

Figure 4B:
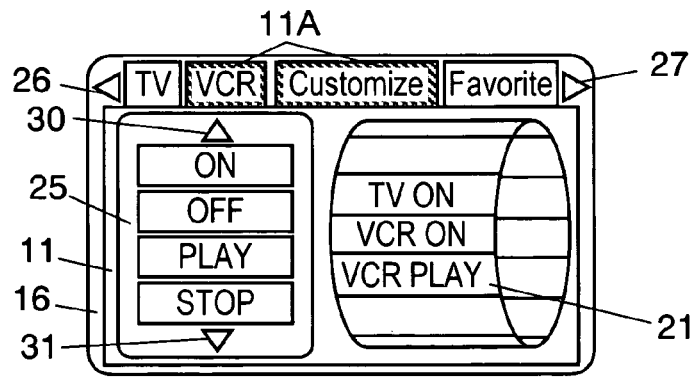

Next, the same operation used in setting "TV ON" is performed on "ON", which represents turning-on of the power to the videocassette recorder, and "PLAY", which represents a replay of a videocassette, on function name selection screen 25. Accordingly, as shown in FIG. 4B, "VCR ON" and "VCR PLAY" are displayed as individual functions 21 on the outer periphery of the cylindrical frame, in addition to "TV ON".

Figure 4C:
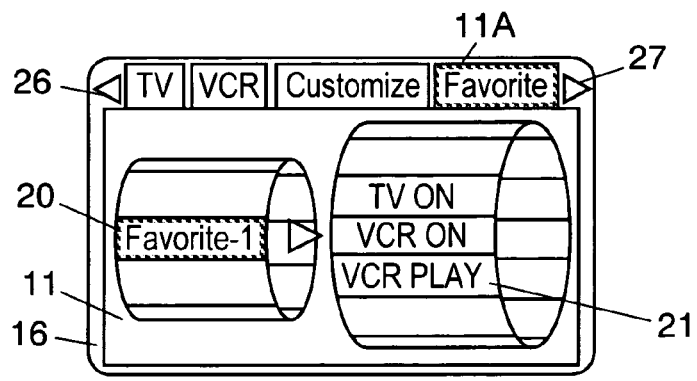

Thereafter, "RETURN" button 12B is pressed, whereby controller 13 judges that the setting has been terminated, erases cursor 11A located at "VCR" (apparatus menu 22) and cursor 11A located at "Customize" (representative menu 23) and effects display of cursor 11A at "Favorite" (representative menu 23) as shown in FIG. 4C.

Controller 13 also replaces function name selection screen 25 with the cylindrical frame showing group menu 20, "Favorite-1", on its outer periphery.

In other words, group menu 20 ("Favorite-1") and its individual functions 21 (i.e. "TV ON", "VCR ON" and "VCR PLAY") are displayed simultaneously.

Next, a part of transparent touch panel 16 that is in front of, for example, "TV ON" (individual function 21) is touched. Upon detecting this touch, controller 13 outputs the electric signal corresponding to the turning-on of the power to the television. Transmitter 14 converts this electric signal into the infrared signal and transmits this infrared signal. Consequently, the power to the television is turned on by remote control.

A description is provided next of setting or storage of the plurality of individual functions including turning on the power to the television, turning on the power to the videocassette recorder and playing back the videocassette, and transmission of all these set functions.

First, the part of transparent touch panel 16 that is in front of "Customize", which is representative menu 23, is touched. Accordingly, group menu name selection screen 24 appears as shown in FIG. 3A, displaying the vertically arranged names of group menus 20, including "Favorite-1" and "Macro-1".

Next, in the same manner as in the addition of the individual functions to "Favorite-1", a part of transparent touch panel 16 that is in front of "Macro-1" is touched, whereby "Macro-1" is selected. Subsequently, the same individual functions as those added to "Favorite-1" are added to "Macro-1" in the same order.

Figure 4D:
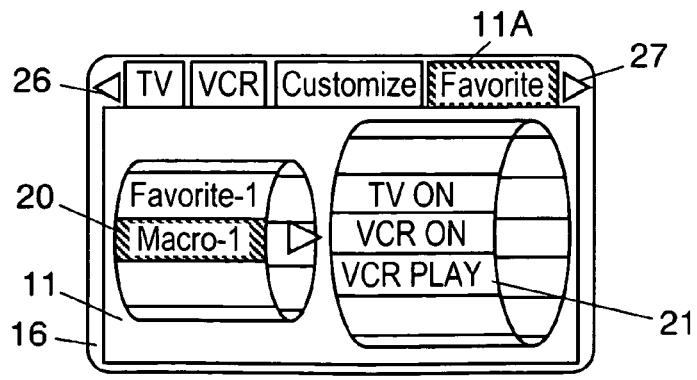

As a result, as shown in FIG. 4D, group menu 20, "Macro-1", is displayed in addition to "Favorite-1" with the same individual functions as those of "Favorite-1" displayed on the right.

In other words, group menu 20 ("Macro-1") and its individual functions 21 (i.e. "TV ON", "VCR ON" and "VCR PLAY") are displayed simultaneously.

Next, a part of transparent touch panel 16 that is in front of "Macro-1" is touched. Upon detecting this touch, controller 13 decides on "Macro-1" (group menu 20) and successively outputs the electric signal corresponding to the turning-on of the power to the television, the electric signal corresponding to the turning-on of the power to the videocassette recorder and the electric signal corresponding to the replay of the videocassette in this order for remote control.

Accordingly, transmitter 14 converts these electric signals into the infrared signals and transmits those infrared signals. As a result, first, the power to the television is turned on, next, the power to the videocassette recorder is turned on, and then the videocassette is replayed by remote control.

Even to remotely control the specified apparatus by selection of this apparatus, not through the performance of the individual functions set in the above manner, the same operation used in performing the set individual functions can be done.

For example, to call up Channel 2 on the television by remote control, first, "TV", which is apparatus menu 22, is touched in FIG. 1 to select the television.

Next, if "CHANNEL" representing the combination of the individual functions of the television is not group menu 20 being selected, "CHANNEL" is touched to be selected.

Then "Channel 2", which is one of the plurality of individual functions 21 included in "CHANNEL" (group menu 20), is touched to be decided on.

As described above, the remote control transmitter of the first embodiment is so constructed that when group menu 20 representing the combination of individual functions 21 is selected by the operation of operating part 12, controller 13 effects display of individual functions 21 of selected group menu 20 in parallel with group menus 20. Since the correspondence between an overview of the plurality of group menus 20 and individual functions 21 of specified group menu 20 is easy to understand, the remote control transmitter obtained allows easy setting of the specified function.

Deciding on specified group menu 20 by the operation of operating part 12 results in the transmission of all individual functions 21 included in this group menu 20, so that the operation for such transmission is facilitated. Deciding on specified individual function 21 of specified group menu 20 that is displayed in parallel with specified group menu 20 results in the transmission of only this specified function 21, so that the operation for such transmission is facilitated.

Displaying apparatus menu 22, which denotes the apparatus to be remotely controlled, in addition to group menu 20 and individual function 21 facilitates the selection of group menu 20 of the specified apparatus. Displaying representative menu 23, which represents the combination of the group menus, in addition to group menu 20 and individual function 21 facilitates the selection of group menu 20 of the specified representative menu.

Displaying group menu 20 and individual function 21 on the respective cylindrical frames can easily remind that, even when group menus 20 or individual functions 21 are too many to be all displayed, group menu 20 or individual function 21 that cannot be displayed is in hiding on a back side of the cylindrical frame. This facilitates the selection of specified group menu 20 or specified individual function 21.

In the above description of the first embodiment, transparent touch panel 16 is disposed at the front of display part 11 for operation such as selecting or deciding on group menu 20 or individual function 21. However, instead of this touch panel 16, a button, a trackball, a pad or the like may be used for such selection and decision.

Figure 5:
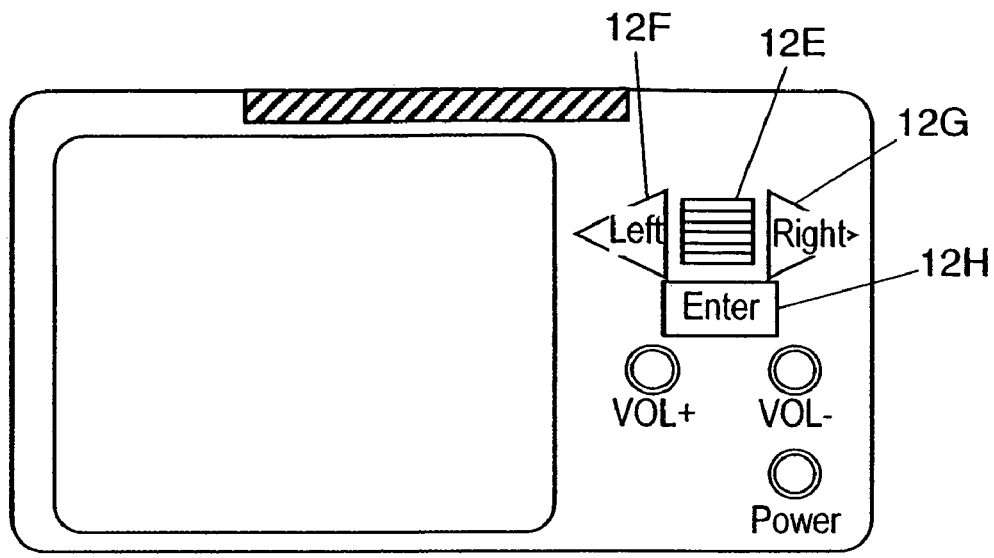
FIG. 5 is an external view of a remote control transmitter in accordance with the first exemplary embodiment of this invention.
Figure 6:
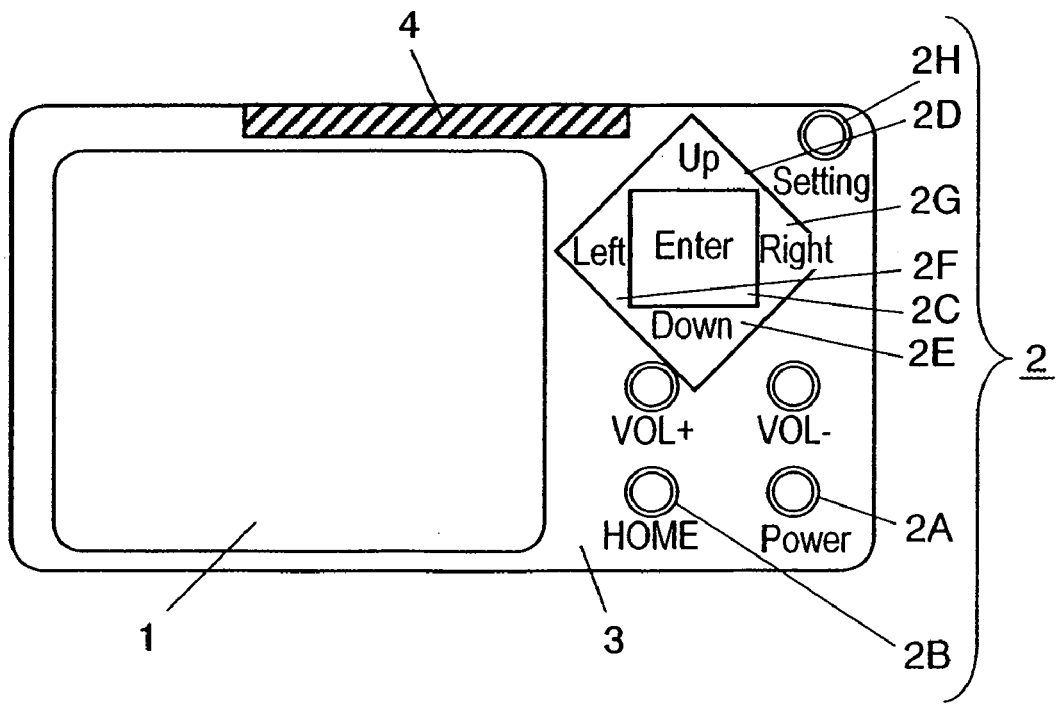
FIG. 6 is an external view of a conventional remote control transmitter.
Figure 7:
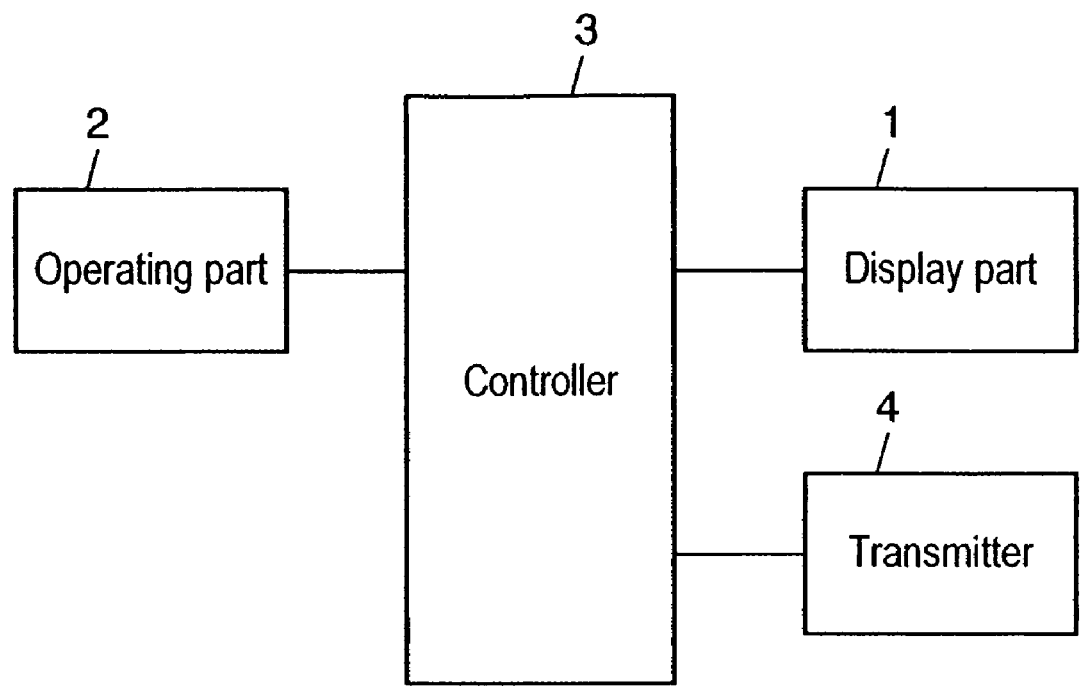
FIG. 7 is a circuit diagram of the conventional remote control transmitter.
Figure 8A:
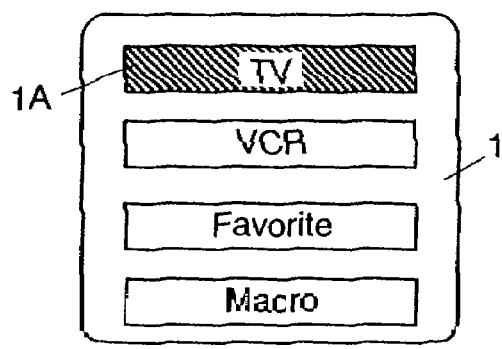
FIGS. 8A, 8B and 8C illustrate respective views of the conventional remote control transmitter.
Figure 8B:
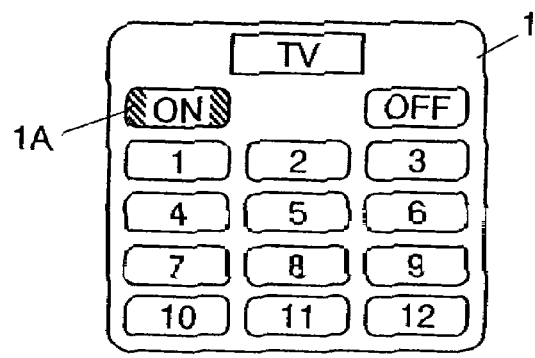
Figure 8C:
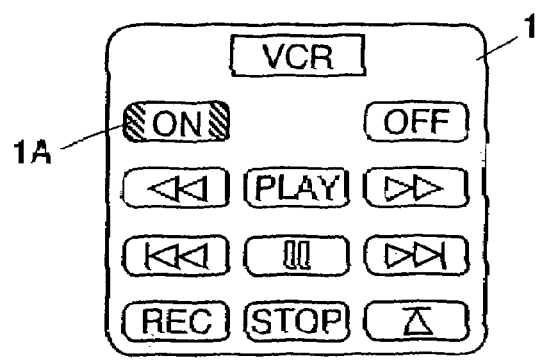

For example, as shown in FIG. 5, selection button 12E which turns vertically for vertical selection, left and right selection buttons 12F, 12G, and "ENTER" button 12H may be formed. With selection buttons 12E, 12F, 12G, cursor 11A is moved to select group menu 20 or individual function 21. With "ENTER" button 12H, the one selected is decided on.

Forming selection button 12E, which not only turns vertically but also can be pressed, placing a switch behind this button 12E for electrical conduction responsive to the press and forming "ENTER" button 12H integrally with selection button 12E not only allows the selection of the function but also the decision with one selection button 12E, thus furthering ease of use.

Selection button 12E can be made spherical and can be formed integrally with left and right selection buttons 12F, 12G.

The remote control transmitter may have selection button 12E on its right side instead of at its right front.

The description has referred to simultaneous display of two apparatus menus 22 and two representative menus 23. However, in cases where the number of menus is too large, causing hard view, the menus may be pushed one after another to the left and right to be all displayed by pushing parts in front of respective left and right ends 26, 27, which face each other across the menus as shown in FIG. 3A.

In cases where the number of names on group menu name selection screen 24 or function name selection screen 25 is too large, causing hard view, the names may be pushed one after another upwardly and downwardly to be all displayed by touching parts in front of respective upper and lower ends 28 and 29 or 30 and 31 facing each other across the names.

In the above description, the name of group menu 20 or the like is selected from group menu name selection screen 24 or the like. However, the name such as "Favorite-1" may be changed to a favorite name such as "Favorite" by inputting letters or the like.

In the above description, deciding on "Macro-1" (group menu 20) results in the transmission of all individual functions 21 included in "Macro-1". However, individual functions 21 included in another group menu 20 such as "Favorite-1" may all be transmitted by selecting "Favorite-1" and selecting "Favorite-1" once again, whereby "Favorite-1" is decided on.

According to the present invention described above, the remote control transmitter obtained allows easy setting of the specified function.

What is claimed is:

1. A remote control transmitter comprising:
    a display part for displaying an apparatus menu for selecting an apparatus, a plurality of individual functions of the selected apparatus to be remotely controlled, and a group menu representing a combination of the individual functions;
    an operating part for selecting and deciding on the at least one of the individual function and the group menu;
    a transmitter for sending a signal for remotely controlling the apparatus; and
    a controller for controlling a view of the display part in response to an operation of the operating part,
    wherein the controller causes the display part to simultaneously display, the apparatus menu, the group menu in response to the selection of the apparatus, and the plurality of individual functions, corresponding to a selection from the group menu when the group menu is selected by the operation of the operating part.

2. The remote control transmitter of claim 1, wherein the individual functions of the group menu are all transmitted when the group menu is decided on by the operation of the operating part, and only a specified individual function is transmitted when the specified individual function displayed in parallel with the group menu is decided on.

3. The remote control transmitter of claim 1, wherein the display part displays at least one of an apparatus menu, which denotes the apparatus to be remotely controlled, and a representative menu, which represents a combination of the group menus, in addition to the group menu and the individual function.

4. The remote control transmitter of claim 1, wherein the group menu is displayed on an outer periphery of a cylindrical frame, and the individual function is displayed on an outer periphery of a cylindrical frame.

5. The remote control transmitter of claim 1, wherein the operating part includes a plurality of selection buttons for selecting and deciding on the at least one of the individual function and the group menu.

6. The remote control transmitter of claim 5, wherein at least one of the plurality of selection buttons is spherical.

* * * * *